(12) United States Patent
Root et al.

(10) Patent No.: US 6,318,811 B1
(45) Date of Patent: Nov. 20, 2001

(54) BRAKE CONTROL UNIT WITH REDUNDANCY

(75) Inventors: Kevin B. Root, Black River; Ronald O. Newton, Adams, both of NY (US); Premal Desai, Melbourne, FL (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/529,049

(22) PCT Filed: Oct. 16, 1997

(86) PCT No.: PCT/IB97/01274

§ 371 Date: Apr. 5, 2000

§ 102(e) Date: Apr. 5, 2000

(87) PCT Pub. No.: WO99/20510

PCT Pub. Date: Apr. 29, 1999

(51) Int. Cl.[7] .................................................. B60T 13/00
(52) U.S. Cl. ........................... 303/7; 303/3; 303/15; 303/20

(58) Field of Search .................................. 303/3, 7, 15, 20

(56) References Cited

U.S. PATENT DOCUMENTS

| 3,819,238 | * | 6/1974 | Cermak | 303/47 |
| 4,052,109 | * | 10/1977 | Nahase et al. | 303/25 |
| 5,172,316 | * | 12/1992 | Root et al. | 364/426.01 |
| 5,192,118 | * | 3/1993 | Balukin et al. | 303/15 |
| 5,222,788 | * | 6/1993 | Dimsa et al. | 303/15 |
| 5,412,572 | * | 5/1995 | Root et al. | 364/426.01 |
| 5,788,338 | * | 8/1998 | Hart et al. | 303/3 |
| 5,927,823 | * | 7/1999 | Dimsa et al. | 303/86 |
| 6,024,419 | * | 2/2000 | Waldrop et al. | 303/3 |
| 6,067,485 | * | 5/2000 | Balukin et al. | 701/19 |
| 6,098,006 | * | 8/2000 | Sherwood et al. | 701/70 |

* cited by examiner

Primary Examiner—Douglas C. Butler
Assistant Examiner—Benjamin A Pezzlo
(74) Attorney, Agent, or Firm—Barnes & Thornburg

(57) ABSTRACT

A brake control unit having a brake cylinder valve (62), equalization reservoir valve (82), brake signal valve (89), and brake back-up valve (182).

17 Claims, 4 Drawing Sheets

BRAKE CONTROL UNIT WITH REDUNDANCY

BACKGROUND AND SUMMARY OF THE INVENTION

The present invention relates generally to computer controlled railroad locomotive brake equipment and more specifically to providing redundancy.

The availability of computer controlled railroad brake equipment includes the CCB equipment available from New York Air Brake Corporation. The CCB locomotive brake control equipment is described in U.S. Pat. No. 5,172,316 and is illustrated in FIGS. 1 and 2. The numbers used throughout this application correspond to that used in this patent for sake of clarity and consistency. With computerized and electric control, the operation of the locomotive and the train must be safe for failure of any electrically controlled portion. In the previously mentioned patent, the triple valve 93 in FIG. 7 in combination with the tow cut-out 92, provided back-up pneumatic control of the brake cylinder for the locomotive. With respect to the brake pipe illustrated in FIG. 6 of the subject patent, no pneumatic control was provided for the brake pipe 40.

Thus, it is the object of the present invention to provide further redundancy including control of the brake pipe.

These and other objects are achieved in a brake control unit having a brake cylinder valve, equalization reservoir valve, brake signal valve and brake back-up valve in combination with the controller for selectively connecting a primary signal from the brake signal valve or a back-up brake signal from the back-up brake signal valve to the brake cylinder valve and for selectively controlling the equalization reservoir with the equalization reservoir valve or the primary brake signal. The controller includes a first electropneumatic valve connecting the primary brake signal from the brake signal valve or the back-up brake signal from the back-up brake valve and a second electropneumatic valve connecting the equalization reservoir with the equalization reservoir valve or the primary brake signal from brake signal valve. A first pressure transducer connected to the output of the brake signal valve is used to control the pressure of the primary brake signal or the equalization reservoir. A second pressure transducer is connected to the output of the equalization reservoir valve and is used to control the pressure of the equalization reservoir when the equalization reservoir valve is used to control the equalization reservoir.

Preferably, the controller includes a local brake signal controller for controlling the brake signal valve and the first electromagnetic valve and being connected to the first transducer. It also includes a local equalization reservoir controller for controlling the equalization reservoir valve and the second electromagnetic valve and being connected to the second transducer. A third transducer connected to the brake cylinder is also connected to the local brake signal controller. A fourth pressure transducer connected to the brake pipe is also connected to the local brake signal controller. The controller may also include a local brake pipe controller for controlling the brake pipe valve and a fifth pressure transducer connected to the brake pipe and the local brake pipe controller.

In addition to a brake pipe vent valve, which vents the brake pipe for emergency conditions, being activated by a pneumatic emergency signal from the control stand and from a first electropneumatic valve operated in responsive to the brake pipe transducer by the local brake pipe controller, the brake pipe vent valve is activated by a pneumatic signal from a second electropneumatic valve operated in response to a control signal from a central controller. The central controller affects brake pipe venting redundancy to the brake pipe local controller and emergency signals from an operator.

Other objects, advantages and novel features of the present invention will become apparent from the following detailed description of the invention when considered in conjunction with the accompanying drawings.

DETAILED DESCRIPTION OF THE DRAWINGS

Figure 1:
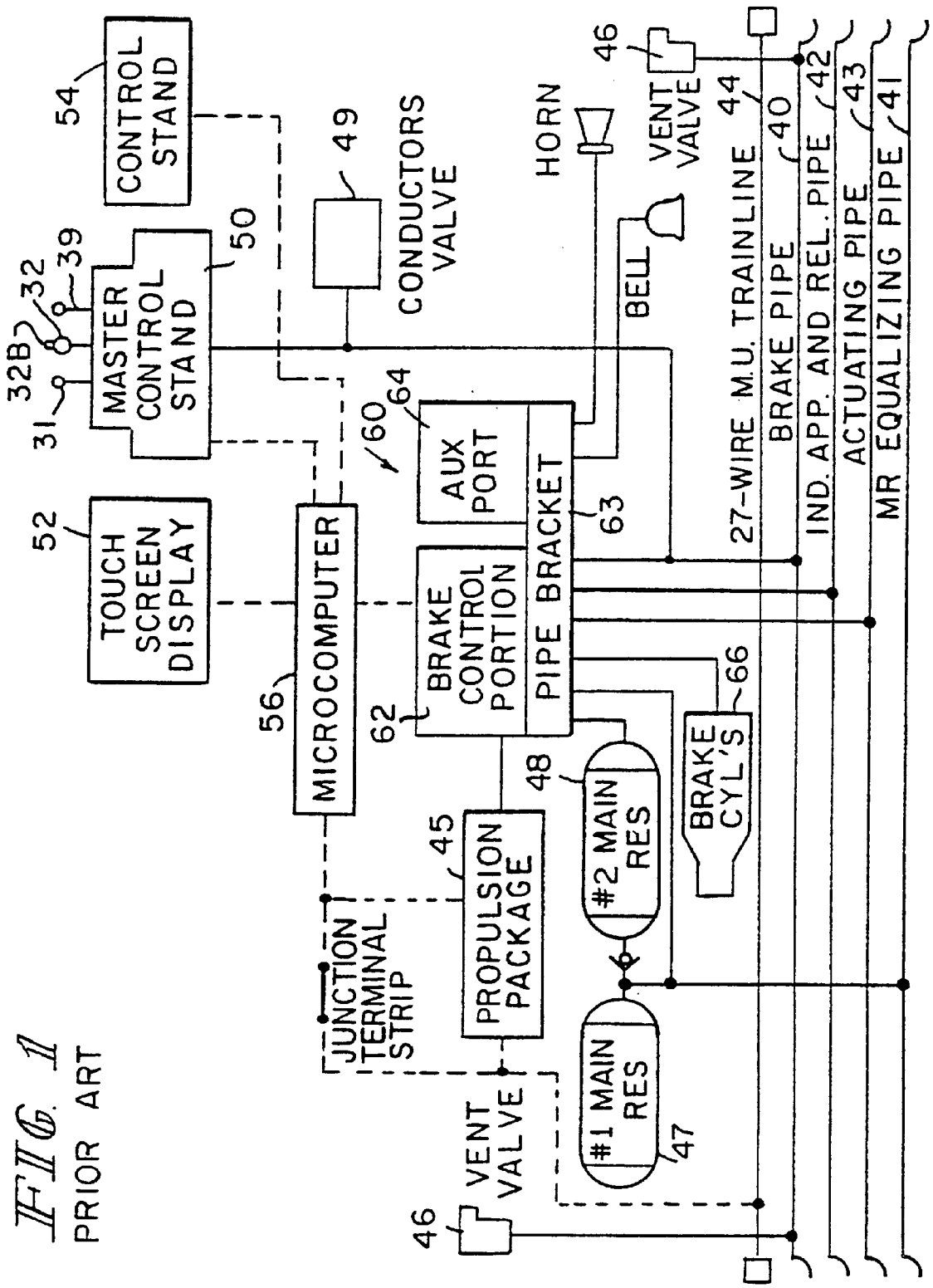
FIG. 1 is a schematic representation of a locomotive control system of the prior art.

A computerized locomotive control system of the prior art which includes the improvement of the present invention is illustrated in FIG. 1. It should be noted that in the Figures the fluid lines of the pneumatic system will be illustrated by solid lines whereas the electrical interconnections will be illustrated by dash lines. Wherever possible, the elements in FIGS. 3 and 4 will have the same numbers as those of the prior art described in FIGS. 1 and 2. All modifications will have a reference number in the hundreds. A master control stand 50 includes this automatic brake handle 31, the independent brake handle 32 and the throttle 39. The locomotive includes the brake pipe 40, the master reservoir equalization pipe 41, the independent application and release pipe 42, actuating pipe 43, and a 27-wire multiple unit electrical trainline 44. The standard pair of venting valves 46 are provided on the brake pipe 42.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electropneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signalling, and for auxiliary controls. The pipe bracket 63 is a connection of all pipe interfaces which provides a unitized valve for simplification of maintenance. The pipe bracket has the required reservoir for brake operations and contains disposable filters for the pneumatic inputs. The brake control portions 62 provides for all braking portions found on the locomotive. This controls the brake pipe 40, the brake cylinder 66 of the locomotive, independent brake pipe 42 and actuating pipe 43. It provides all the required electrical interfaces for the operation of the brake system. The auxiliary portion 64 provides pneumatic controls for the special functions. This may be for the sanding, pneumatic horns, bells etc. Auxiliary portion 64 operates independent of the brake valve. A first main reservoir 47 is connected to the main reservoir equalization pipe 41 as is a second main reservoir 48. The second main reservoir 48 is connected to the electromagnetic interface control valve 60.

The system of FIG. 1 is a simplification of the controls by consolidating the numerous engineer control devices in a central location. Controls have been consolidated into a three handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54. Other than the master control stand 50 and the brake pipe 40 providing an emergency brake application directly to the brake pipe 40, the master control stand 50 is connected to the pneumatic part of the brake system through the microcomputer 56.

The automatic brake handle 31 provides signals to the microcomputer 56 to the level of command brake or special commands. The independent brake handle 32, which provides independent control over the locomotive brake versus the train brake of the automatic brake handle 31, also provides signals to the microcomputer 56 proportional to the handles' extreme positions. The independent brake handle 32 includes a button 32 which actuates a momentary switch. The pressing of button 32*b* is a command to pressurize the actuating pipe 43. Release of the button will vent the actuating pipe 43. This provides the "bail-off" feature of the automatic brake and if the button is continuously depressed, "bailoff" of an emergency brake. Alternatively, the independent brake handle 32 could itself be physically depressed to effectuate this function mechanically and pneumatically. The throttle 39 is a control for the 27-wire trainline 44 for power and dynamic braking.

Figure 2:
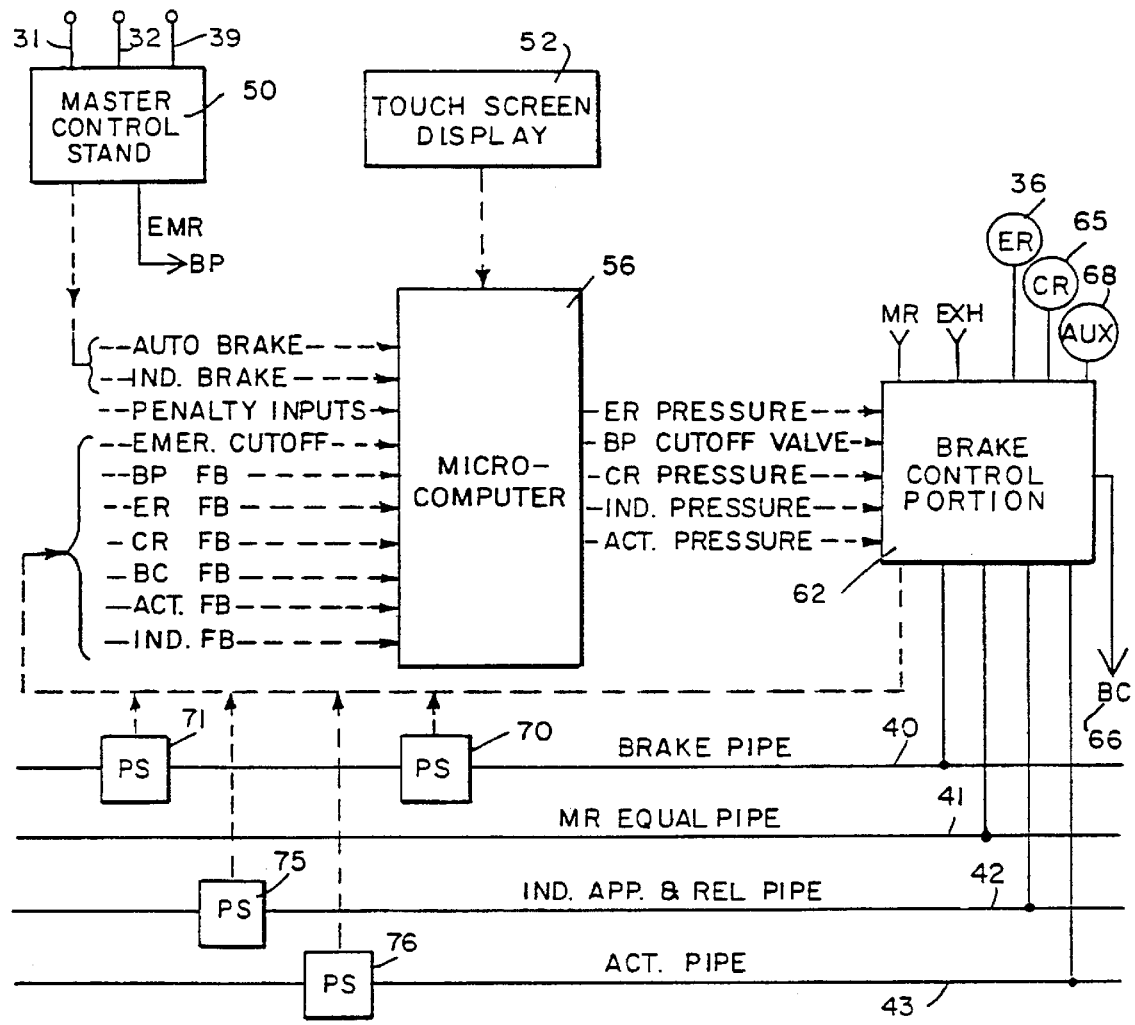
FIG. 2 is a block diagram of a computer controlled railroad locomotive brake equipment of the prior art.

An overview of the brake control portion 62 of the interface control valve 60 will be described with respect to FIG. 2. The brake control portion 62 is connected to main reservoir MR, the main reservoir equalization pipe 41,and exhaust EXH as well as the equalization reservoir 36,the control reservoir 65, and the auxiliary reservoir 68 pneumatically. It also provides a pneumatic output to the brake cylinder BC, 66, the brake pipe 40, the independent application and release pipe 42 and the actuating pipe 43.

Brake control portion 62 receives electrical control signals for the equalization reservoir pressure, brake pipe cutoff valve, the control reservoir pressure, the independent application and release pipe pressure and the actuating pipe pressure from the microcomputer 56. Inputs to the microcomputer 56 includes the automatic brake and independent brake electrical signals from the master control stand 50, penalty inputs from standard penalty devices as electrical signals as well as a group of electrical feedback signals. These feedback signals from pressure sensors in FIGS. 2, 3 and 4 include brake pipe pressure 70, emergency cutoff pressure 71, equalization reservoir pressure 72, control reservoir pressure 74, brake cylinder pressure 73, actuating pipe pressure 76 and independent application and release pipe pressure 75.

Figure 3:
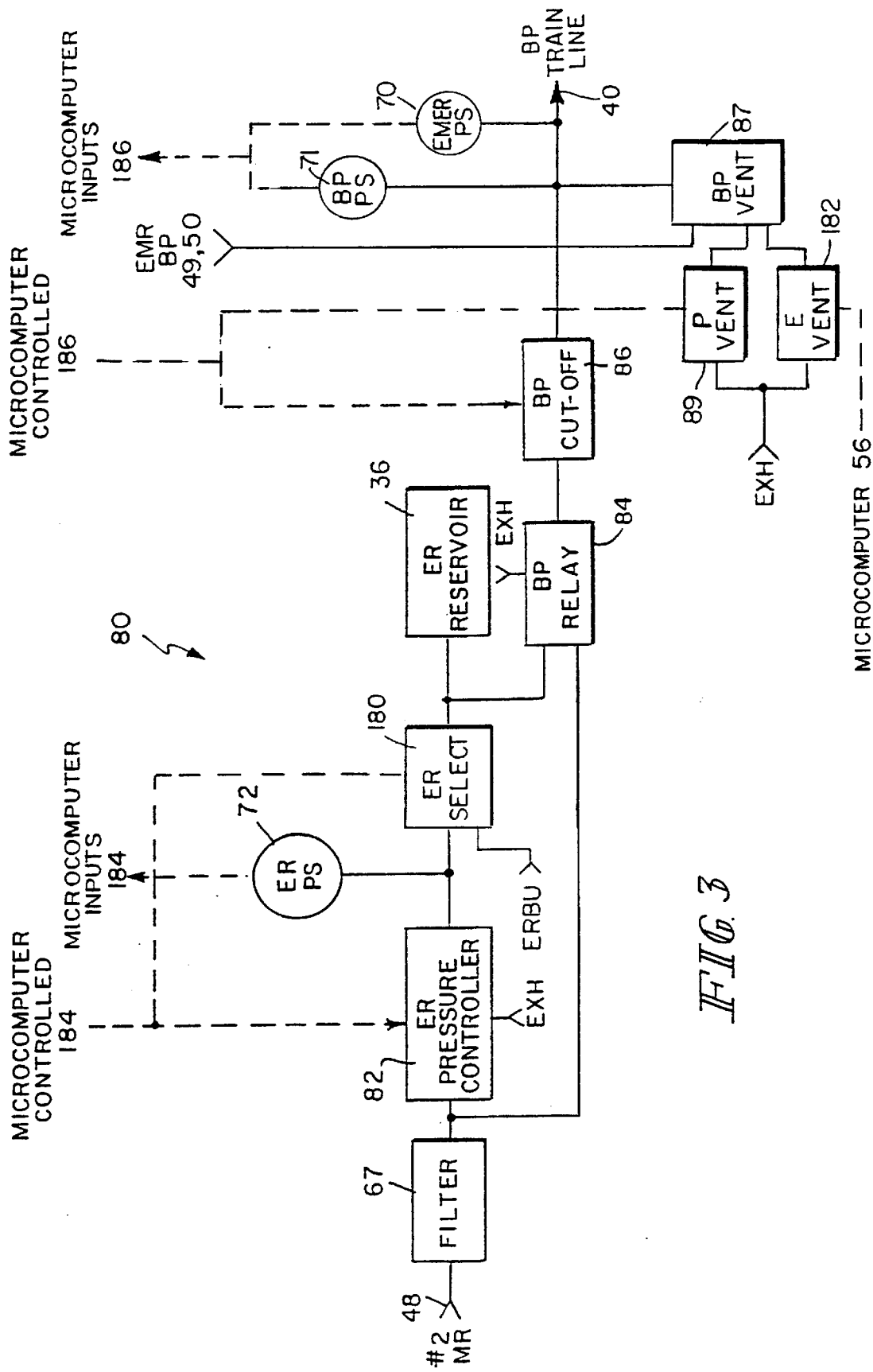
FIG. 3 is a block diagram of the brake pipe control incorporating the principles of the present invention.

The circuitry for the brake pipe control 80 of the brake control portion 62 of the interface control valve 60 is active only if the locomotive is in the lead or keyed in mode and is illustrated in FIG. 3. Brake pipe control 80 is connected to the second main reservoir 48 through a filter 67. Equalization reservoir 36 has its pressure controlled by the equalization reservoir pressure controller 82 under the command of the microcomputer 184. The pressure of the equalization reservoir 36 is measured by a pressure sensor 72 and fed back to the microcomputer 184. The value of the pressure in the equalization reservoir 36 is provided to the brake pipe relay 84 which will transmit a portion of the main reservoir's 48 pressure to the trainline brake pipe 40 through brake pipe cutoff 86. The brake pipe cutoff 86 is an electro-pneumatic device under the control of the microcomputer 186. Brake pipe pressure sensor 71 and emergency pressure cutoff sensor 70 are also shown in FIG. 3.

Also connected to the brake pipe 40 is a pneumatic brake pipe vent valve 87 which vents brake pipe to exhaust to produce an emergency condition. The vent valve 87 is responsive to a pneumatic brake pipe signal EMR BP from control stand 50 and conductor's valve 49. An electropneumatic vent valve 89 is controlled by the microcomputer 186 when its senses an emergency condition, for example, from emergency sensor 70 to pneumatically operate BP vent valve 87.

The first modification of the prior art system is the provision of an equalization reservoir select valve 180. The equalization reservoir select valve 180 receives one input from the equalization reservoir pressure controller 82 and another as a back-up signal. ERBU from the brake cylinder control 90 of FIG. 4 to be explained. The equalization reservoir select valve 180 is an electropneumatic valve under a computer control. Its output is used to control the pressure of the equalization reservoir 36 and as the input to the brake pipe relay 84.

A second modification of the brake pipe control 80 is the addition of a second electropneumatic vent valve 182 connected in parallel with the first electropneumatic vent valve 89 to provide a pneumatic signal to operate brake pipe vent valve 87. The electropneumatic vent valve 182 is responsive to an emergency or brake pipe vent signal from the microcomputer 56. This provides a back-up to the local controller 186 and electropneumatic vent valve 89 as well as pneumatic signals from the control stand. While the vent valve 89 is responsive to brake pipe emergency signals, the vent valve may be operated for any condition the control microcomputer 56 determined to be on emergency.

As a preferred third modification, the brake pipe control 80 includes two separate microcomputers, 184 and 186. The microcomputer 184 controls the equalization reservoir components while the microcomputer 186 controls the connection of the equalization reservoir 36 to the brake pipe cut-off valve 86 and brake pipe vent valve 182. Although separate microcomputer 184 and 186 are preferred, a single controller or computer may be used.

The equalization reservoir pressure controller 82 is an electro-pneumatic device which operates to control the reference pressure within the equalization reservoir 36. Preferably, the equalization reservoir pressure control 82 is a pair of electropneumatic valves, one being a supply valve connected to the main reservoir MR2 and the other being an exhaust valve connected to exhaust EXH. A closed loop analog controller using the desired pressure from the microcomputer 184 and the feedback from the equalization reservoir pressure sensor 72 provides appropriate control signals for the equalization reservoir 36. Preferably, the controller is pulse width modulated, for example, Unit AW4 available from New York Air Brake Corporation and described in detail in U.S. Pat. No. 4,253,480. Other electropneumatic valves may be used to selectively connect the main reservoir MR or exhaust EXH to control the pressure of the equalization reservoir 36.

The equalization reservoir select valve 180 is an electropneumatic valve under the controlled microcomputer 184 to select as a control signal for the equalization reservoir 36 either the output of the equalization reservoir pressure control 82 or a back-up equalization reservoir signal ERBU. During normal operation, this equalization reservoir select valve 180 selects the equalization reservoir pressure controller 82. Upon failure of a signal from the microcomputer 184, the back-up signal ERBU is selected.

As is well known, the brake pipe relay 84 is a pneumatic device that monitors the pressure within the equalization reservoir 36 and duplicates its pressure level to the output for the brake pipe 40. On equalization reservoir 36 pressure reduction, the brake pipe relay 84 will exhaust brake pipe 40 at a controlled service rate. The brake pipe relay 84 and the equalization reservoir pressure controller 82 are self maintaining. The brake pipe cutoff 86 is a digital electro-pneumatic device which prevents the brake pipe charging or exhaust a) when the locomotive is in the trial mode b) in the event of an emergency brake application, c) during brake pipe leakage tests as commanded from the engineer and d) for hosting operation. The brake pipe cutoff device 86 is under the control of the microcomputer 186 and a null signal is a cut-in command.

As previously noted, the brake pipe pressure sensor 71 and the emergency cutoff pressure sensor 70 monitor the brake pipe 40. The brake pipe sensor 71 provides a signal of the actual pressure in the brake pipe 40 whereas the emergency cutoff sensor 70 need only monitor the emergency brake application. Thus the two different devices provide distinct and independent signals.

Figure 4:
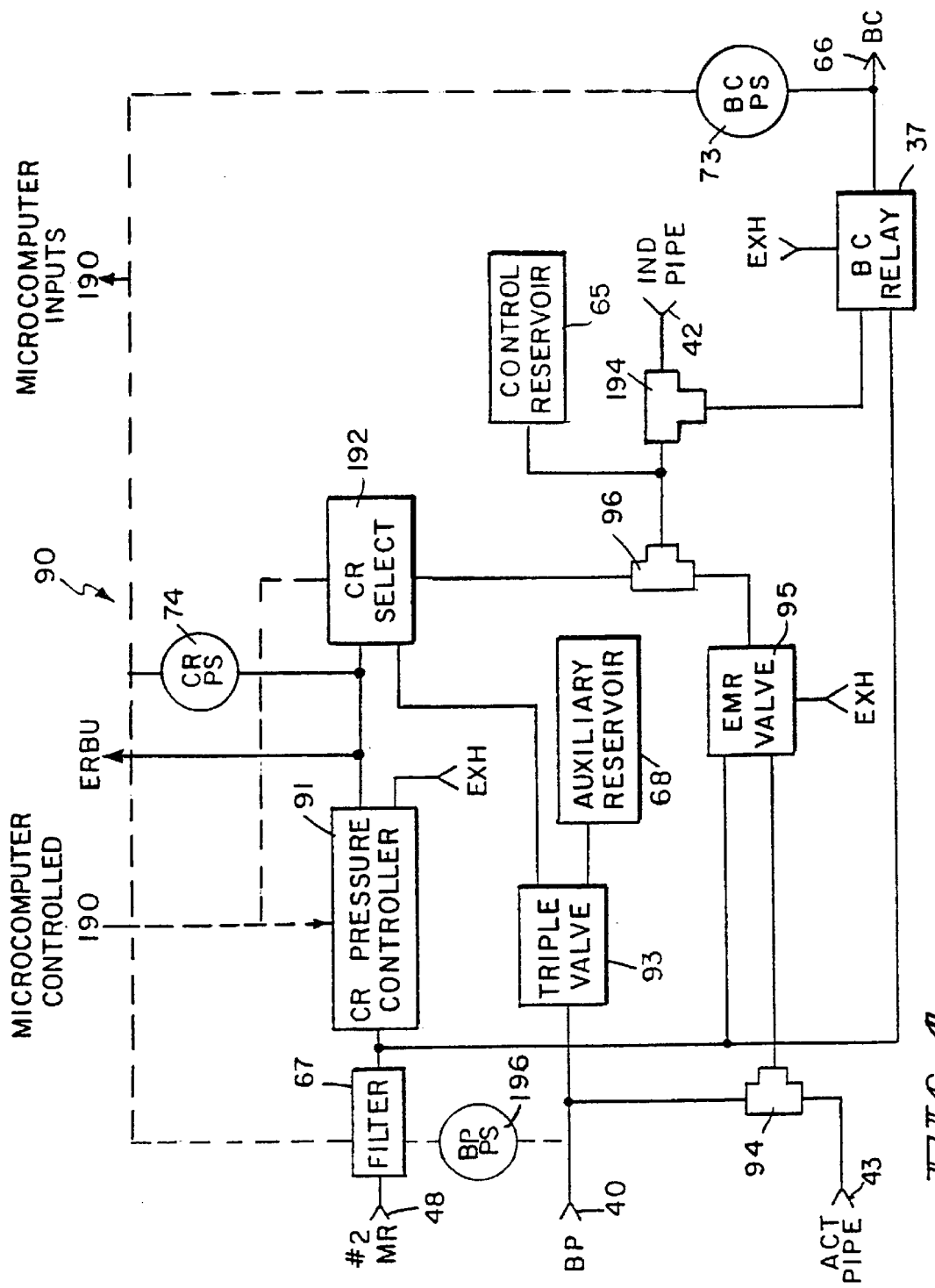
FIG. 4 is a block diagram illustrating the brake cylinder control incorporating the principles of the present invention.

The circuit for the brake cylinder control 90 of the brake control portion 62 of the interface control valve 60 is illustrated in FIG. 4 as having an input from the second main reservoir 48 through common filter 67 to the control reservoir controller 91. The control reservoir pressure controller 91, under control of microcomputer 196, determines the pressure at its output, which is sensed by the control reservoir pressure sensor 74 and provided as an input to the microcomputer 196. The control reservoir pressure controller 91 is connected to the control reservoir 65 through control reservoir select valve 192 which is controlled by the microcomputer 196. A triple valve 93 is responsive to the brake pipe 40 to connect the auxiliary reservoir 68 to the control reservoir select valve 192.

The output of the control reservoir select valve 192 is connected to a double check valve 96. The second input to the double check valve 96 is an emergency valve 95 which receives on its controlling input the brake pipe pressure on brake pipe 40 or the pressure from the actuating pipe 43. The higher the two signals is provided by the double check valve 94 to the emergency valve 95. The main reservoir 48 is the supply input to the emergency valve 95. The higher value of the output of the emergency valve 95 and control reservoir select valve 192 is provided by the double check valve 96 to the control reservoir 65.

The control reservoir 65 and the independent application and release pipe 42 are provided as two inputs of a double check valve 194. The output of the double check valve 194, which is the higher of the two, is provided as the control input to a brake cylinder relay 37. The source input of the brake cylinder relay 37 is from the main reservoir 48. The output of the brake cylinder relay 37 is connected to the brake cylinder 66. The pressure of the brake cylinder 66 is measured by the brake cylinder pressure sensor 73 and provided as an input back to the microcomputer 190.

The output of the control reservoir pressure controller 91 is also provided as the equalization reservoir back-up signal ERBU to the equalization reservoir select valve 180 of FIG. 3. An additional brake pipe sensor 196 is connected to brake pipe 40 and to the microcomputer 190 of the brake cylinder control 90. As previously discussed, preferably microcomputer 190 is used in combination with controllers 184 and 186. Alternatively, a single microcontroller may be used.

As will be discussed below, the equalization reservoir select valve 180, the control reservoir select valve 192, brake pipe pressure sensor 196 and microcomputer 190 allow the control reservoir pressure controller 91 to provide a back-up to the equalization reservoir controller and allows the triple valve 93 to act as a pneumatic back-up for the control reservoir pressure controller 91 if it is inoperable or when it is back-up to the equalization reservoir pressure controller 82. The use of separate microcomputers 184, 186 and 190 allow back-up or redundancy with respect to the computers as well as the pressure controllers.

Service brake cylinder pressure is controlled solely by the microcomputer 190 under normal operating conditions. Emergency brake pressure is pneumatically controlled, circumventing any command of the microcomputer 190. The control reservoir select valve 192 in combination with the triple valve 93 provides for pneumatic control service brake for tow of a faulty locomotive or failure of microcomputer 190 or control reservoir pressure controller 91. The control reservoir pressure controller 91 is an electro-pneumatic device to control the reference pressure in the control reservoir 65. The microcomputer 190 controls the output pressure electrically for command of automatic service brake level. The control is fully variable from zero psi to main reservoir pressure. Preferably, the control reservoir controller 91 is an analog supply and exhaust valve AW4.

In the preferred embodiment, the microcomputer 190 derives the control, for the control reservoir pressure controller 91 from sensed pipe pressure signals from the brake pipe 40 and from a control microcomputer 56 which monitors the independent application and release pipe 42 and actuator pipe 43. The train braking signal on these three pipes are produced by the brake control portion 62 on this or another locomotive and the microcomputer 56 on all locomotives respond to the same pipe pressure signals at the same time. As an alternative, the microcomputer 56 could derive the controls for microcomputer 190 and the control reservoir pressure controller 91 from the master stand 50 if the locomotive is in the lead mode. This is not preferred since appropriate time delays would have to be present to prevent the lead locomotive from applying its brakes before the remainder of the train.

In the event of an emergency brake signal on the brake pipe 40, the emergency valve 95 actuates pneumatically a loss of brake pipe pressure. The emergency valve 95 supplies a preset pressure output from the main reservoir 48 directly to the control port of the brake cylinder relay 37 negating any command pressure on the other input of the double acting check valve 96 from the microcomputer controlled controller 91 or the independent pipe 42 at double check 194. This emergency pressure output command may be removed to release the locomotive brake 66 by pressurizing the actuating pipe 43. This signal on actuating pipe 43 through double check valve 94 changes control input of emergency valve 95. The double check valve 96 also limits the output pressure from the control reservoir 65 to the emergency pressure level and prevents a malfunction of the control reservoir pressure controller 91.

On the failure of the microcomputer 190 or control reservoir pressure control 91 for any cause, the triple valve 93 is included to act as a back-up and to tow the locomotive. The triple valve 93 will provide automatic service brake control pressure and is a displacement valve brake control device. To switch over from the reservoir pressure controller 91 to the triple valve 93 as a controller for the control reservoir 65 is under the control of the control reservoir select valve 192.

The triple valve 93 charges the auxiliary reservoir 68 at a controlled rate within the value of the brake pipe 40 pressure. When the brake pipe pressure is reduced, the triple valve 93 will move to the applied position providing auxiliary reservoir 68 pressure to the control reservoir 65. This flow will cease when the auxiliary reservoir pressure has reduced to brake pipe 40 pressure. The triple valve 93 will move into the lap position. Further reduction of brake pipe will again cause the auxiliary reservoir pressure to flow to the control reservoir 65 thereby increasing the brake cylinder pressure until the auxiliary reservoir 68 is reduced to the level of the brake pipe 40. In this manner, the brake may be gradually applied until equalization of the pressure of the combined volume of the auxiliary reservoir 613 and the control reservoir 65. Any further brake pipe reduction will not increase the brake cylinder's 66 pressure. Increasing the brake pipe 40 pressure will result in immediate complete release of the control reservoir 65 pressure, and thus release of the brake cylinder pressure. The triple valve 93 will have moved to the release position.

To summarize the redundancy illustrated in FIGS. 3 and 4, the control reservoir select 192 allows the disconnection of the output of the control reservoir pressure controller 91 from the control of the control reservoir 65 for the brake cylinder relay 37. This allows complete pneumatic operation of the control reservoir 65 and the brake cylinder relay 37 by the triple valve 93 in combination with the emergency valve 95. Also, the control reservoir select valve 192, by disconnecting the control pressure controller 191 from the control reservoir 65 allows the control pressure controller 191 to be used as a back-up for the equalization reservoir 36 and its control of the brake pipe relay 84.

Upon detection of the failure of the equalization reservoir pressure controller 82 or its computer, the equalization reservoir select 180 selects the equalization reservoir back-up signal ERBU from the output of the control reservoir pressure control 191. The microcomputer 190 now assumes the identity and responsibility of the equalization reservoir control. The control reservoir pressure sensor 74 is considered to be the equalization reservoir pressure sensor 72 and the microcomputer 190 receives the equalization reservoir control signals from the main computer 56. The additional brake pipe sensor 196 provides the brake pipe feedback to the microcomputer 190 equivalent to the brake pipe sensor 71.

With respect to the control reservoir 65, the output of the control reservoir pressure controller 191 is considered the primary pneumatic brake signal. The output of the triple valve 93 is considered the back-up brake control signal for the control reservoir 65. Thus, the primary brake signal from control reservoir pressure control 91 is provided as a signal for the equalization reservoir control.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A brake control unit comprising:
   a brake pipe valve controlling pressure at a brake pipe port in response to pressure at an equalization reservoir port;
   a brake cylinder valve controlling pressure at a brake cylinder port in response to a brake signal;
   an equalization reservoir valve controlling pressure at said equalization reservoir port;
   a brake signal valve providing pneumatic primary brake signals;
   a back-up brake valve providing pneumatic back-up brake signals in response to pressure at said brake pipe port; and
   a controller selectively connecting said primary or said back-up brake signals to said brake cylinder valve and selectively controlling said equalization reservoir port with said equalization reservoir valve or said primary brake signal.

2. A control unit according to claim 1, wherein said controller includes:
   a first electropneumatic valve connecting said primary brake signal from said brake signal valve or said back-up brake signal from said back-up brake valve to said brake cylinder valve; and
   a second electropneumatic valve connecting said equalization reservoir port with said equalization reservoir valve or said primary brake signal from said brake signal valve.

3. A control unit according to claim 2, wherein said controller includes a first pressure transducer connected to the output of said brake signal valve and used to control the pressure of the primary brake signal or the equalization reservoir port, and a second pressure transducer connected to the output of said equalization reservoir valve and used to control the pressure of the equalization reservoir port.

4. A control unit according to claim 3, wherein said controller includes:
   a local brake signal controller controlling said brake signal valve and said first electropneumatic valve and connected to said first transducer;
   a local equalization reservoir controller controlling said equalization reservoir valve and said second electropneumatic valve and connected to said second transducer; and
   a third pressure transducer connected to said brake cylinder port and said local brake signal controller.

5. A control unit according to claim 4, wherein said controller includes a fourth pressure transducer connected to said brake pipe port and said local brake signal controller.

6. A control unit according to claim 5, wherein said controller includes a local brake pipe controller controlling said brake pipe valve, and a fifth pressure transducer connected to said brake cylinder port and said local brake pipe controller.

7. A control unit according to claim 1, wherein said controller includes a first pressure transducer connected to the output of said brake signal valve and used to control the pressure of the primary brake signal or the equalization reservoir port, and a second pressure transducer connected to the output of said equalization reservoir valve and used to control the pressure of the equalization reservoir port.

8. A control unit according to claim 7, wherein said controller includes:
- a local brake signal controller controlling said brake signal valve and connected to said first transducer;
- a local equalization reservoir controller controlling said equalization reservoir valve and connected to said second transducer; and
- a third pressure transducer connected to said brake cylinder port and said local brake signal controller.

9. A control unit according to claim 8, wherein said controller includes a fourth pressure transducer connected to said brake pipe port and said local brake signal controller.

10. A control unit according to claim 1, wherein said equalization reservoir valve and said brake signal valve are electropneumatic valves controlled by said controller.

11. A control unit according to claim 1, wherein said controller is an electropneumatic controller.

12. A control unit according to claim 1, wherein said controller includes:
- a local brake signal controller controlling said brake signal valve and selectively connecting said primary or said back-up brake signals to said brake cylinder valve; and
- a local equalization reservoir controller controlling said equalization reservoir valve and for selectively controlling said equalization reservoir port with said equalization reservoir valve or said primary brake signal.

13. A control unit according to claim 12, wherein said local controllers each includes a computer and electropneumatic valves.

14. A brake control unit comprising:
- a brake pipe valve controlling pressure at a brake pipe port in response to an input signal;
- a brake cylinder valve controlling pressure at a brake cylinder port in response to a brake signal;
- a brake pipe signal valve providing pneumatic brake pipe signals;
- a brake signal valve providing pneumatic primary brake signals;
- a back-up brake valve providing pneumatic back-up brake signals in response to pressure at said brake pipe port; and
- a controller selectively connecting said brake pipe signal or said primary brake signal to said brake pipe valve as said input signal and selectively connecting said primary or said back-up brake signals to said brake cylinder valve as said brake signal.

15. A control unit according to claim 14, wherein said controller includes:
- a local brake pipe controller controlling said brake pipe signal valve and for selectively connecting said brake pipe signal or said primary brake signal to said brake pipe valve as said input signal;
- a local brake signal controller controlling said brake signal valve and selectively connecting said primary or said back-up brake signals to said brake cylinder valve as said brake signal.

16. A brake control unit comprising:

an electropneumatic brake pipe valve controlling pressure at a brake pipe port;

- a pneumatic vent valve venting a brake pipe port in response to pneumatic input signals;
- a first electropneumatic vent signal valve providing first pneumatic input signals to said vent valve;
- a second electropneumatic vent signal valve providing second pneumatic input signals to said vent valve;
- a local brake pipe controller monitoring said brake pipe port and controlling said brake pipe valve and said first vent signal valve; and
- a central controller controlling said second vent signal valve.

17. A control unit according to claim 16, including a manually actuated vent signal valve providing pneumatic input signals to said vent valve.

* * * * *